United States Patent [19]

Blackwell

[11] 3,761,185

[45] Sept. 25, 1973

[54] LASER LIGHT PULSE MONITORING SYSTEM

[75] Inventor: Druce Blackwell, Long Beach, Calif.

[73] Assignee: TRW Inc., Redondo Beach, Calif.

[22] Filed: Dec. 18, 1970

[21] Appl. No.: 99,373

[52] U.S. Cl............... 356/229, 328/116, 328/147, 328/151, 324/103, 324/111, 250/214

[51] Int. Cl........................ G01j 1/10, G01r 19/08

[58] Field of Search.................. 328/116, 147, 148, 328/151, 153; 324/103 R, 103 P, 111, 114, 77 A, 140; 250/214; 356/226

[56] References Cited
UNITED STATES PATENTS
2,837,639   6/1958   Gray et al. ........................ 328/116
3,325,750   6/1967   O'Hearn et al. ................... 331/166

*Primary Examiner*—Ronald L. Wibert
*Assistant Examiner*—R. T. Webster
*Attorney*—Daniel T. Anderson; Jerry A. Dinardo and Edwin A. Oser

[57] ABSTRACT

The light output of a doubly pulsed laser is monitored by converting the two successive light pulses into corresponding electrical pulses and feeding the electrical pulses to a pair of parallel connected circuit channels. A first one of the circuit channels is conditioned to receive the first electrical pulse while a second one of the circuit channels is rendered immune to that pulse. The first electrical pulse charges a capacitor to a voltage proportional to the pulse amplitude and the voltage is displayed on a direct current voltmeter. The second circuit channel is conditioned to receive the second electrical pulse while the first circuit channel is rendered immune to that pulse. The second electrical pulse charges another capacitor to a voltage proportional to the pulse amplitude and the voltage is displayed on another meter. Both voltages are maintained for comparison with one another, after which the circuit channels may be reset to their initial condition for reception of the next set of electrical pulses.

9 Claims, 1 Drawing Figure

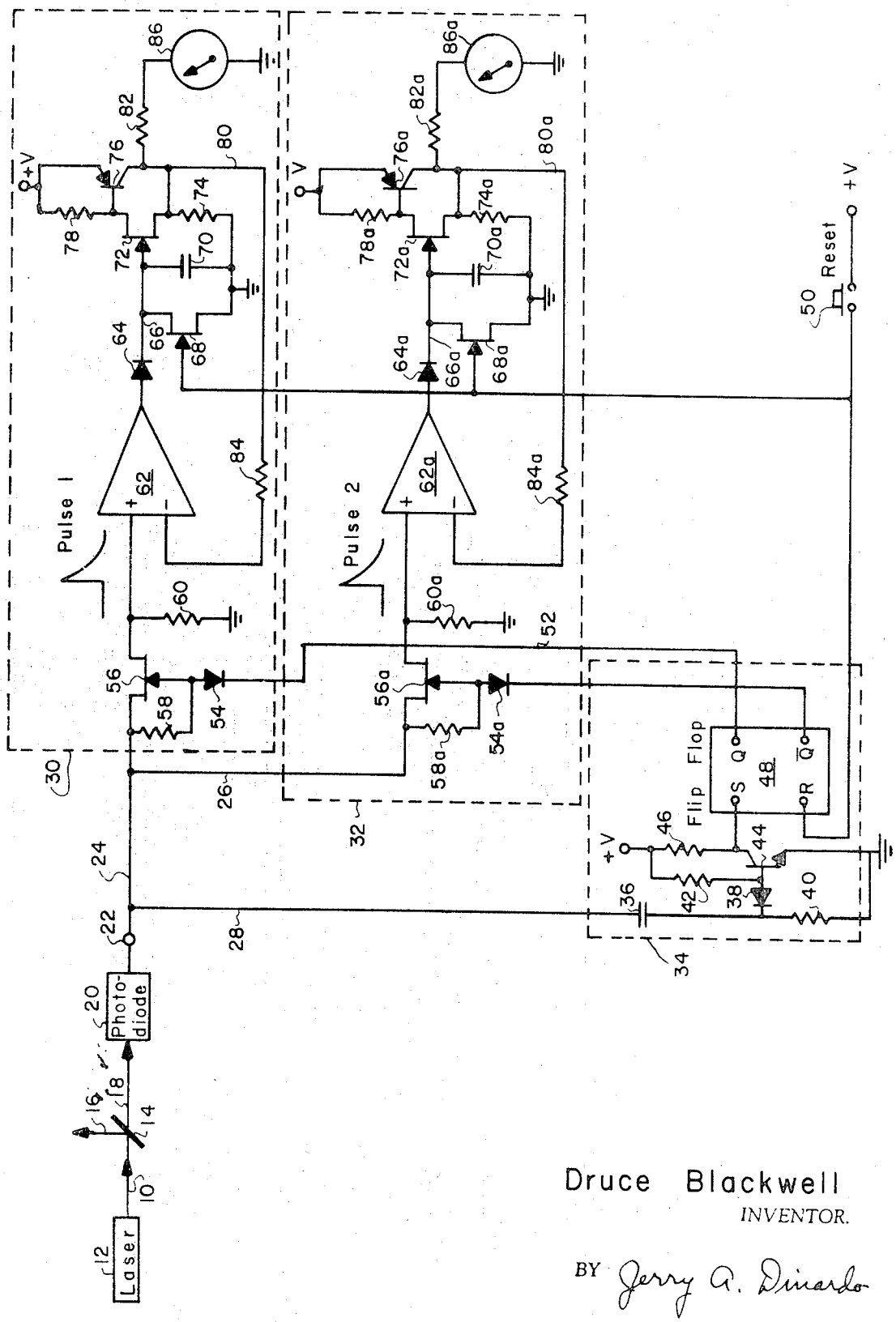

LASER LIGHT PULSE MONITORING SYSTEM

BACKGROUND OF THE INVENTION

1. Field of the Invention

This invention relates to laser light pulse monitoring systems and particularly to simplified circuitry for translating the light energy of the two rapidly recurring laser light pulses of a doubly pulsed laser into direct current voltages for voltmeter display and comparison.

2. Description of the Prior Art

In practicing holographic interferometry with a doubly pulsed ruby laser, better fringe contrast of the interferogram is obtained if the two successive laser pulses are of approximately the same energy. Therefore, it is customary to monitor the laser light output. This is usually done by exposing a photo diode to a small fraction of the laser output, with the output of the photo diode passing through an RC integrating circuit to produce an output voltage proportional to laser energy, and this is usually displayed on an oscilloscope. This voltage decays with a time constant determined by the RC parameters. When the laser is doubly pulsed in rapid succession, as is often done in dynamic interferometry, two time spaced pulses are displayed on the scope, each with a very sharp rise and an exponential decay. The laser light energy is proportional to the height of each pulse.

The above method of monitoring the laser output during holographic interferometry is not entirely satisfactory, because it requires an oscilloscope and introduces experimental complexity for the operator of the holography equipment. The operator must be familiar with oscilloscopes, and more important, the operator must devote a significant effort to the observation of the pulses. The present invention eliminates those shortcomings by providing a display of the energy of each pulse on a panel meter, with the meter indication retained until a reset action is taken.

SUMMARY OF THE INVENTION

A system for measuring the relative intensity of first and second rapidly recurring laser light pulses includes a light responsive device, such as a photo diode, for converting the laser light pulses into corresponding electrical pulses. The electrical pulses are fed to separate signal channels or circuits to develop two separate direct current voltages of corresponding magnitude respectively. The voltages are displayed concurrently for direct comparison so that any required adjustment can be made in the laser apparatus prior to the next laser pulse sequence. Means are provided for resetting the signal channels to their initial condition to accept the next pair of electrical pulses.

BRIEF DESCRIPTION OF THE DRAWING

The single figure is a schematic circuit of a system for monitoring the laser light energy of a doubly pulsed laser.

DESCRIPTION OF THE PREFERRED EMBODIMENT

Referring now to the drawing, the output light beam 10 of a laser 12 is divided by a beam splitter 14 into a main light beam 16, and an auxiliary light beam 18. The main light beam 16 may be used in conjunction with other components in the operation of apparatus designed for the practice of holographic interferometry. In such applications, the laser 12 is doubly pulsed; that is, it is pulsed twice in rapid succession for each operational sequence.

To monitor the intensity of the laser bursts, which should be of equal intensity, the auxiliary light beam 18, representing a small fraction of the output light beam 10, is directed onto a photo diode 20. The photo diode 20 converts the auxiliary light beam 18 into an input electrical signal which is fed to an input terminal 22. The input electrical signal consists of two electrical pulses occurring in rapid succession and hereinafter referred to as pulse number 1 and pulse number 2, respectively, or simply pulse 1 and pulse 2.

The input signal is fed to three branches or circuits by way of the bus lines 24, 26, and 28 connected to the input terminal 22. The first two bus lines 24 and 26 conduct the input signal to two identical signal channels, namely, a first signal channel 30 and a second signal channel 32, while the third bus line 28 conducts the input signal to a control circuit 34, whose output is coupled to the signal channels 30 and 32. The control circuit 34 operates on the signal channels 30 and 32 in such a way that pulse 1 is conducted through the first signal channel 30 and blocked from the second signal channel 32, whereas pulse 2 is blocked from the first signal channel 30 and conducted through the second signal channel 32.

In the control circuit 34, the bus line 28 is connected to one side of a coupling capacitor 36. A diode 38 has its cathode connected to the other side of the coupling capacitor 36 and to one end of a bias resistor 40, with the other end of the bias resistor 40 being grounded. The anode of the diode 38 is connected through a resistor 42 to a positive dc supply, identified as +V. The anode of the diode 38 is also connected to the base of an npn transistor 44, whose emitter is grounded. The collector of the transistor 44 is connected through a resistor 46 to the dc supply +V. The collector of the transistor 44 is also connected to the set input S of a flip flop 48. The reset input R of the flip flop 48 is connected to one side of a normally open reset switch 50. The other side of the reset switch 50 is connected to a positive dc supply +V.

The flip flop 48 has binary outputs which are identified as Q and $\overline{Q}$. A positive signal applied to the reset input R will cause the Q output to be zero and $\overline{Q}$ output to be plus (+). A positive signal applied to the set input S will cause the Q output to be zero and the $\overline{Q}$ output to be plus (+). Output Q is fed to the first signal channel 30 and output $\overline{Q}$ is fed to the second signal channel 32. More particularly, output Q is fed along a conductor 52 to the cathode of a diode 54. This diode 54 controls the state of a first field effect transistor 56. The anode of the diode 54 is connected to the gate of the field effect transistor 56. The drain of the field effect transistor 56 is connected to the bus line 24. A bias resistor 58 is connected between the drain and gate of the field effect transistor 56. A resistor 60 is connected between the source of the field effect transistor 56 and ground.

The source of the field effect transistor 56 is connected to the plus (+) input of an operational amplifier 62, the output of which is connected to the anode of a diode 64. The operational amplifier 62 has a second input or minus (−) input in addition to the plus (+) input. The plus (+) input is the non-inverting input and the minus (−) input is the inverting input. That is, when the plus (+) input is positive relative to the minus (−) input, the output will be positive; and when the minus (−) input is positive relative to the plus (+) input, the output will be negative.

The cathode of the diode 64 is connected to a common bus 66 to which is connected the drain of a second field effect transistor 68, one side of a capacitor 70, and the gate of a third field effect transistor 72. The gate of the second field effect transistor 68 is connected to one side of the reset switch 50. The source of the second field effect transistor 68 and the other side of the capacitor 70 are grounded. A resistor 74 is connected between the source of the third effect transistor 72 and ground.

A pnp transistor 76 has its base connected to the drain of the third field effect transistor 72 and to one end of a resistor 78. The other end of the resistor 78 and the emitter of the transistor 76 are connected to a dc supply +V. The collector of the transistor 76 is connected to a common bus 80. To the common bus 80 are connected the junction between the resistor 74 and the source of the third field effect transistor 72, one end of a current limiting resistor 82, and one end of a feedback resistor 84. A dc voltmeter 86 is connected between the other end of the current limiting resistor 82 and ground. The other end of the feedback resistor 84 is connected to the negative (−) input of the operational amplifier 62.

The second signal channel 32 is identical to the first signal channel and corresponding parts are identified in the second signal channel 32 by the same numerals used in the first signal channel 30 just described, except that the numerals are followed by the subscript a. Thus the $\overline{Q}$ output of the flip flop 48 is connected to the cathode of the diode 54a; and the drain of the field effect transistor 56a and one side of the resistor 58a are connected to the bus line 26.

The operation will now be described. In the quiescent condition, the npn transistor 44 is conducting and the voltage at the set input S, which is at the same potential as the collector of the transistor 44, is ground or zero. The reset switch 50 is closed momentarily to couple a positive input from the dc supply +V to the reset input R of the flip flop 48. With these input conditions, the $\overline{Q}$ output is zero and the output is plus (+). The zero signal from the $\overline{Q}$ output forward biases the diode 54a and places the field effect transistor 56a on in the off condition. The plus (+) signal from the Q output reverse biases the diode 54 off and places the field effect transistor 56 in the on condition.

When the laser is doubly pulsed, two electrical positive going pulses will appear at the input terminal 22, with the pulses spaced from about 1 to 1000 microseconds apart, for example. The first input pulse, which is identified as pulse 1, will be blocked from the second signal channel 32 because of the off or open condition of the field effect transistor 56a in the second signal channel 32. Pulse 1 will be conducted through the first signal channel 30 by the field effect transistor 56 in the first signal channel 30, the transistor 56 being in the on or closed condition. Pulse 1 is applied to the plus (+) input of the operational amplifier 62 causing an amplified pulse of the same positive sign to appear in the output. The amplified positive pulse forward biases the diode 64, conducts through the latter and charges the capacitor 70. At this point in time, the field effect transistor 68 is off because there is an open circuit to the gate thereof. As the voltage on the capacitor 70 rises, so does the voltage on the collector of the pnp transistor 76 because the circuit therebetween is a non-inverting amplifier. The current flowing through the meter 86 is a measure of the output current of transistor 76.

The output of the transistor 76 is fed back to the minus (−) input of the operational amplifier 62. In the operational amplifier 62, the minus (−) input follows the plus (+) input until the plus (+) input, or pulse 1 starts going in a negative direction. When this occurs, the diode 64 becomes reversed biased, thereby blocking the flow of current therethrough in the reverse direction. Since the capacitor 70 has no conducting path through which to discharge, it remains charged and the meter 86 indicates the peak current output of the transistor 76.

Pulse 1 is also conducted along bus line 28 and coupled through the capacitor 32 to the cathode of the diode 38. On the positive swing of pulse 1, the diode 38 is reversed biased and it blocks pulse 1 from the npn transistor 44. On the negative or downward swing of pulse 1, the negative going voltage appearing on the cathode of the diode 38 forward biases the diode 38, pulling the base of the transistor 44 negative and turning the transistor 44 off. This causes the collector of the transistor 44 to go positive, thereby applying a signal to the set input of the flip flop 48. The flip flop 48 changes its output so that now the Q output is zero and the $\overline{Q}$ output is plus (+).

The zero signal from the Q output forward biases the diode 54, turning it on and turning the field effect transistor 56 off. Pulse 2 will thereby be blocked from the first signal channel 30. The plus signal from the $\overline{Q}$ output reverse biases the diode 54a, turning it off and turning on the field effect transistor 56a. Pulse 2 will thereby be conducted through the second signal channel 32.

When pulse 2 appears at the input terminal 22, it will be blocked from the first signal channel 30 but it will pass through the second signal channel 32 in the same manner described above for pulse 1 in the first signal channel. Pulse 2 will give rise to a second output voltage which is read on the second meter 86a. The two meter readings can be compared to determine whether any adjustment must be made on the laser 12 to bring the laser pulses more nearly equal to each other.

When the meter readings have been taken, it is necessary to reset the circuits to receive the next two input pulses and to take the next meter readings. To condition the apparatus, the button on the reset switch 50 is momentarily depressed, applying a positive voltage to the gates of the field effect transistors 68 and 68a and turning them on. The capacitors 70 and 70a discharge through the transistors 68 and 68a respectively.

Additionally, upon closing the switch 50, a positive voltage is applied to the reset input R of the flip flop 48 so that the $\overline{Q}$ output is now changed from plus (+) to zero, turning diode 54a on and field effect transistor 56a off. The second signal channel 32 is now blocked. When the flip flop is reset, the Q output is changed from zero to plus (+), turning diode 54 off and field effect transistor 56 on. Now the first signal channel 30 is in condition to conduct the first one of the next two input pulses.

Some modifications can be made in the circuits without departing from the essence of the invention. For example, instead of using the flip flop 48 to control the conductance of the signal channels 30 and 32, the field effect transistors 56 and 56a may be turned on and off by properly timed gating pulses from a pulse generator that is actuated from the output of the photo diode 20. Furthermore, the operational amplifiers 62 and 62a may be replaced by voltage followers that do not employ feedback. However, such a modified arrangement would lack the stabilizing influence of the feedback circuit and would provide less accuracy in the pulse measurements.

I claim:

1. In a system for measuring the relative intensity of first and second rapidly recurring laser light pulses:
   means responsive to said first laser light pulse for developing a first electrical pulse whose amplitude is a function of the energy of said first laser light pulse;
   a first signal channel receptive of said first electrical pulse including means for converting said pulse into a corresponding first direct current voltage and for measuring said first voltage;
   means responsive to said second laser light pulse for developing a second electrical pulse whose amplitude is a function of the energy of said second laser light pulse;
   a second signal channel receptive of said second electrical pulse for converting said pulse into a corresponding second direct current voltage and for measuring said second voltage;
   said first signal channel being provided with means for maintaining said first voltage for a prolonged time after the occurrence of said second laser light pulse and after measurement of said second voltage, whereby said first and second direct current voltages may be compared;
   field effect transistor gating means in each of said signal channels for receiving said electrical pulses and for conducting them to said voltage converting means; and
   a flip flop control circuit receptive of said electrical pulses and providing binary outputs coupled to said field effect transistor gating means and operative thereon so as to conduct said first electrical pulse through said first signal channel field effect transistor gating means while blocking the same from said second signal channel and to conduct said second electrical pulse through said second signal channel field effect transistor gating means while blocking the same from said first signal channel.

2. The invention according to claim 1, and further including means provided within said second channel for prolonging said second voltage for the duration of said first voltage.

3. The invention according to claim 1, wherein said first and second channels are connected in parallel across an input terminal in series with said electrical pulse developing means.

4. The invention according to claim 1, wherein said means for developing said first electrical pulse is in common with said means for developing said second electrical pulse.

5. In a system for measuring the relative intensity of time-spaced light pulses from a doubly pulsed laser:
   means for converting portions of said light pulses into corresponding first and second electrical pulses;
   first and second signal channels connected in parallel with an input terminal for receiving said electrical pulses;
   field effect transistor gating means in each of said signal channels;
   a flip flop control circuit receptive of said electrical pulses and providing binary outputs coupled to said gating means and operative thereon so as to conduct said first electrical pulse through said first signal channel field effect transistor gating means while blocking the same from said second signal channel and to conduct said second electrical pulse through said second signal channel field effect transistor gating means while blocking the same from said first signal channel;
   means in said first and second signal channels for converting said electrical pulses from said field effect transistor gating means into corresponding first and second direct current signals;
   means in said signal channels from holding said direct current signal for contemporaneous measurement; and
   means for measuring the relative amplitudes of said direct current signals while they are contemporaneously held.

6. The invention according to claim 5, wherein each of said signal channel includes a capacitor charging circuit for developing a direct current voltage signal related to the peak amplitude of each of said first and second electrical signals respectively.

7. The invention according to claim 5, and further including in each signal channel a diode having its anode connected to the gate of one of said field effect transistors and its cathode connected to one of the outputs of said flip flop for controlling the state of the respective field effect.

8. The invention according to claim 5, wherein said pulse converting means includes in each signal channel an operational amplifier for amplifying said electrical pulse when it is applied to the plus input thereof, a diode in series therewith for conducting said amplified pulse during its rise when said diode is forward biased and for blocking said amplified pulse during its fall when said diode is reverse biased, and a capacitor and a field effect transistor in parallel with each other and in series with said diode and said operational amplifier;
   said capacitor charging to a voltage corresponding to the peak value of said amplified pulse and holding said voltage so long as said diode is reverse baised and said field effect transistor is normally gated off;
   said capacitor discharging its voltage through said field effect transistor when the latter is gated on upon command.

9. The invention according to claim 8 and further including a non-inverting amplifier connected across said capacitor for deriving an output current indicative of the voltage on said capacitor and in feedback arrangement with said operational amplifier for applying a replica of said electrical pulse to the minus input of said operational amplifier.

* * * * *

UNITED STATES PATENT OFFICE
CERTIFICATE OF CORRECTION

Patent No. __3,761,185__          Dated __September 25, 1973__

Inventor(s) __Druce Blackwell__

It is certified that error appears in the above-identified patent and that said Letters Patent are hereby corrected as shown below:

Column 2, line 16   Delete "the", first occurrence, and substitute --three--

Column 2, line 46   Delete "$\bar{Q}$", first occurrence, and substitute --Q--

Column 2, line 47   Delete "Q", first occurrence, and substitute --$\bar{Q}$--

Column 3, line 46   After "the", first occurrence, insert --Q--

Column 3, line 47   After "54a" insert --on--

Column 3, line 48   Delete "on"

Column 5, line 30   After "pulse", first occurrence, insert --including means--

Column 6, line 31   Delete "channel" and substitute --channels--

Signed and sealed this 19th day of February 1974.

(SEAL)
Attest:

EDWARD M. FLETCHER, JR.
Attesting Officer

C. MARSHALL DANN
Commissioner of Patents